United States Patent [19]
Hansen et al.
[11] Patent Number: 4,801,919
[45] Date of Patent: Jan. 31, 1989

[54] METHOD FOR PREVENTING FLARING IN ELECTROGRAPHIC RECORDING AND RECORDING MEDIUM THEREFOR

[75] Inventors: Lorin K. Hansen, Fremont; Arvind R. Saklikar, Sunnyvale, both of Calif.
[73] Assignee: Xerox Corporation, Stamford, Conn.

[21] Appl. No.: 81,397
[22] Filed: Aug. 4, 1987
[51] Int. Cl.[4] .............................................. G01D 15/00
[52] U.S. Cl. .................................. 346/153.1; 346/155
[58] Field of Search ...................... 346/1.1, 150, 153.1, 346/155, 162–165; 427/13–27; 430/33, 38

[56] References Cited

U.S. PATENT DOCUMENTS

| | | | |
|---|---|---|---|
| 3,657,005 | 4/1972 | Brown, Jr. et al. | 117/201 |
| 3,956,571 | 5/1976 | Takao et al. | 428/513 |
| 4,097,646 | 6/1978 | Kitahara et al. | 428/323 |
| 4,250,228 | 2/1981 | Fujioka | 346/153.1 |
| 4,309,486 | 1/1982 | Sack et al. | 428/511 |
| 4,336,306 | 6/1982 | Fellows | 346/153.1 |
| 4,404,574 | 9/1983 | Burwasser et al. | 346/153.1 |

*Primary Examiner*—Arthur G. Evans
*Attorney, Agent, or Firm*—W. Douglas Carothers, Jr.

[57] ABSTRACT

Flaring phenomenon in electrographic recording can be substantially reduce, if not eliminated, forming uniform latent image spots by providing a flaring suppressor agent in or on the surface of the dielectric charge retentive layer of the electrographic recording medium. The improvement comprises incorporating a flaring suppressor agent in the composition of the dielectric charge retentive layer of the electrographic recording medium or coating a flaring suppressor agent on the surface of the dielectric charge retentive layer of the electrographic recording medium to enhance the charge retentive properties of the layer and quench lateral electrical discharge breakdown during recording use thereof. A suitable flaring suppressor agent comprise fluoro carbons or fluoro sulfurs or organo metallic salts or soaps. Specific examples of agents are polyvinyl fluoride, sulfur hexafluoride or zinc stearate.

7 Claims, 1 Drawing Sheet

METHOD FOR PREVENTING FLARING IN ELECTROGRAPHIC RECORDING AND RECORDING MEDIUM THEREFOR

Background of the Invention

This invention relates to a recording medium for electrographic printing or recording and a method for preventing flaring to occur in electrographic recording and more particularly to a recording medium having a suppressor agent to substantially prevent flaring to occur in electrographic recording.

Conventional recording medium of the type here is used in electrographic recording and generally comprises an electrically conductive layer, base or substrate upon which is deposited a thin dielectric layer. Materials used in the dielectric layers are high level insulating resins, such as organic solvent type resins, silicone resins, epoxy resins, polyvinyl acetates, vinyl chloride resins, styrenebutadiene copolymers, polystyrene, polymethacrylic acid ester, polyvinylidene chloride, polyvinyl acetate, polyester and the like. These resins, in general, are dissolved in an organic solvent and coated on the medium base, which is a base paper. The thickness of the dielectric layer has been known to range from 1 μm to 20 μm. The medium base may be a conductive paper support impregnated with a conductive material, e.g. soaked or coated on both sides with an electrolyte prior to the deposition of the dielectric layer.

As is well known in the art, the dielectric layer of the recording medium functions as a charge carrying or retentive layer. Electrostatic images are formed on the surface of the dielectric layer by establishing electrically charged areas on the recording medium via charging electrode means and the images are made visible with a dry or wet developer comprising a toner and a carrier which has a polarity opposite to the polarity of the deposited charge forming the electrostatic image.

One of the problems encountered in electrographic recording is that the electrical discharge, via the recording electrodes or nibs in the electrographic head, is not always uniform so that the latent electrostatic image spots created on the recording medium are nonuniform in shape and may be enlarged or irregular in size compared to other latent image spots. This phenomenon is known in the art as "fare" or "flaring". Flare is detrimental to the quality of printed or plotted images on the recording medium because the spot sizes formed on the recording medium on discharge of the nibs are not uniform and flare out in an irregular pattern. Also, arcing across nibs to the recording medium further causes such enlargement and destructive disfiguration of the uniformity of spot size. To prevent flaring from occurring, limiting resistors have been placed in the driving logic or in the electrode lead lines leading to the nibs to limit the flow of current to the nibs and prevent such arcing and spot size irregularity.

However, the problem of flaring still prevails in the art in spite of the utilization of such limiting resistors. Flaring still occurs and spot sizes, while being more uniform in size, still remain with ragged edges and nonuniform size.

It is the object of this invention to provide a means and method for eliminating, if not substantially reducing, flaring in the electrostatic imaging process by introducing modifications to the recording medium.

Summary of the Invention

According to this invention, flaring in electrographic recording can be substantially reduce, if not eliminated, forming uniform latent image spots by providing a flaring suppressor agent in or on the surface of the dielectric charge retentive layer of the electrographic recording medium. The improvement comprises incorporating a flaring suppressor agent in the composition of the dielectric charge retentive layer of the electrographic recording medium or coating a flaring suppressor agent on the surface of the dielectric charge retentive layer of the electrographic recording medium to enhance the charge retentive properties of the layer and quench lateral electrical discharge breakdown during recording use thereof. A suitable flaring suppressor agent comprises fluoro carbons or fluoro sulfurs or organo metallic salts or soaps. Specific examples of agents are polyvinyl fluoride, sulfur hexafloride and zinc stearate.

Other objects and attainments together with a fuller understanding of the invention will become apparent and appreciated by referring to the following description and claims taken in conjunction with the accompanying drawings.

Detailed Description of the Preferred Embodiments

Figure 1:
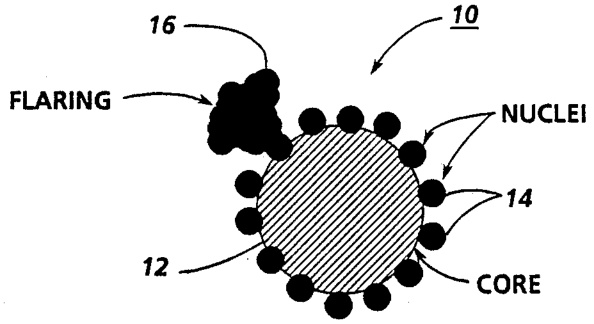
FIG. 1 is an enlarged schematic drawing illustrating the nature of flaring via a developed pixel spot from a single nib of an electrographic head.
Figure 2:
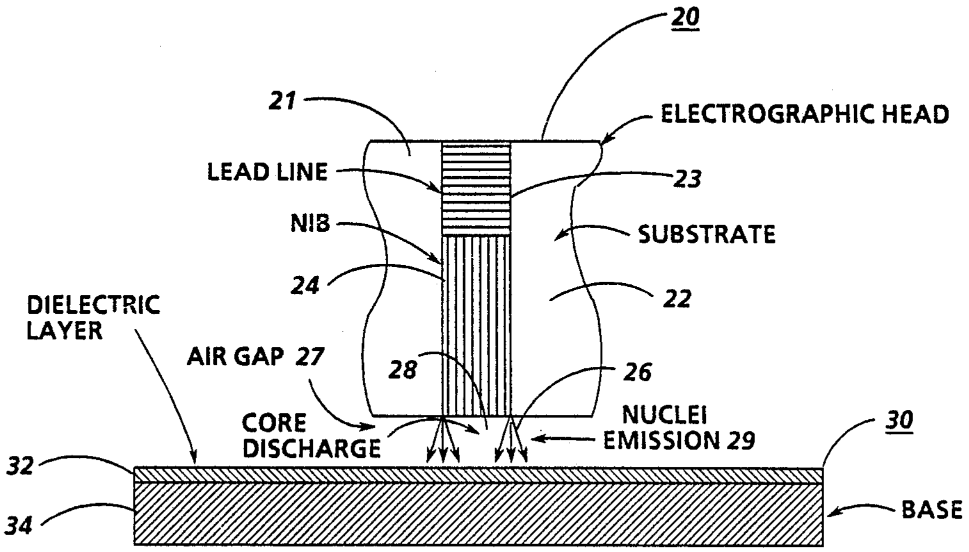
FIG. 2 is an enlarged schematic drawing illustrating the relationship between one writing nib of an electrographic head and the standard recording medium, illustrating the electrical fields during discharge.

Reference is now made to FIGS. 1 and 2 wherein there is shown in FIG. 1 is a representation of the appearance of a single developed pixel 10 initially formed as a circular latent image spot by a single electrode or nib 24, shown in FIG. 2, and subsequently made visible with a conventional developer. Thus, the developed pixel 10 represents a visual appearance of the latent image spot. The pixel 10 is made up of a core 12 and nuclei 14 surrounding core 12. In many cases flaring 16 will appear along nuclei 14 resulting in a nonuniform developed image spot represented by the outer contour of pixel 10. In FIG. 1, core 12 is shown in cross hatch so as to distinguishable from nuclei 14 but would normally be integrally developed with the remaining portion of the developed pixel.

Nuclei 14 are always formed around the perimeter of core 12. Core 12 is charged corresponding to the writing voltage applied between nib 24 and a counter electrode (not shown).

FIG. 2 is a model for explaining the phenomenon occurring in the charging process via electrographic head 20 and recording medium 30. Only one nib 24 in head 20 is shown for purpose of clarity. Nib 24 is formed on substrate 21, e.g a printed circuit board, and is connected to lead line 23 for supplying a charging voltage to nib 24. Air gap 27 exists between the end of nib 24 and the surface of recording medium 30 in order that the medium surface may be charged or receive deposited charge. Medium 30 comprise a dielectric layer 32 deposited on a conductive paper base 34.

A charging voltage in the form of a pulse(s) is applied between nib 24 and its counter electrode, which may be about −600 volts, for example. Because of electric field concentrations during charging via nib 24 at edges of the nib, there is a field emission 29 of electrons at the nib edges. These electrons cause ionization of air in gap 27. This ionization ignites a glow discharge 28 int he region of core 12. The portion of gap 27 represented by the core discharge 28 becomes ionized and, therefore, conductive. The core discharge region 28 charges up to a voltage until the voltage across the core gap drops below the glow discharge maintenance voltage, for example −380 volts. When the voltage drops below the glow discharge maintenance, the discharge core 28 will be extinguished and the charge deposition on the surface of medium 30 will be complete.

If the charge deposited at one of the nuclei 14 becomes excessive, there develops a lateral electrical breakdown or spreading of this charge across the surface of dielectric layer 32. This spreading out of negative deposited charge is called a "flare" or "flaring". There are several factors that contribute to the probability and magnitude of flares. First, writing with high voltages increases the amount of charge deposited and, therefore, the probability of a lateral breakdown across the dielectric surface of medium 30.

Second, sometimes the field emission sites at the nib edges are conductive or metallic, microscopic protrusions in nature. The emission current from such sites can heat the protrusions or heat the dielectric material adjacent to the sites via emitted electrons slammed into the dielectric after being accelerated through a high voltage field. In any case, gas molecules in the region may also evolve which carry the ionized gas out beyond the core discharge region 28, allowing laterial breakdown to carry charge far beyond region 28, as exhibited by the extent of flare 16 in FIG. 1.

Third, there may be a positive feedback occurring during flaring generation. A microscopic protrusion on the surface of dielectric layer 32 can emit an electrical field during charging and its emission current can heat the protrusion and possibly adjacent regions causing dielectric material to vaporize and release gas molecules. These gas molecules will become ionized and any positive ions present will be left behind as electrons are quickly swept away from the site. This dramatically increases the emission field at the site thereby correspondingly increasing the emission of electrons at the field. This positive feedback can contribute to a run away condition resulting in a micro thermal explosion at the protrusion at the site. The occurrence of this process of the emission changing, in part, from a field emission of electrons to a field assisted thermonic emission causes (1) an increase in molecular gas spreading from region 28, (2) vaporized material, which now may be in a more conductive state, to be deposited on the surface of dielectric layer 32 reducing the Paschen breakdown voltage at gap 27 and (3) the maintenance voltage of nuclei emission 29 to change, for example, from hundreds of volts at the core discharge region 28 to tens of volts. As a result, its not approximately 100 volt discharge deposited on dielectric layer 32 beneath region 28 but rather an approximately 500 volt discharge is deposited. This much higher and excessive deposited charge, combined with violent molecular gas spreading, and metallic deposition on dielectric layer 32 will most certainly produce a large flare 16.

We have discovered flaring suppressor means provided in or on the dielectric coating layer 32 of recording medium 30 will function to suppress or quench the electron emission and field assisted thermonic emission process at or adjacent to nuclei emission 29 if vaporized due to the forgoing mentioned processes and will strongly attract electrons if not so vaporized. In any case, the flaring suppressor agent is composed of material comprising electronegative molecules. The flaring suppressor agent may be coated on the surface of dielectric layer 32 or doped in the dielectric material comprising dielectric layer 32. Examples of materials comprising a flaring suppressor agent are fluoro carbons, such as polyvinyl fluoride ($PVF_2$), and fluoro sulfurs, such as sulfur hexafloride ($SF_6$). Other examples are organo metallic salts or soaps, e.g. zirconium actoate, calcium stearate, zinc stearate and iron neonap; unsaturated polyester polymers; styrenated acrylic polymers; florinated or chlorinated compatible polymers added to a selected dielectric coating polymer, such as, acrylic, polyester, polystyrene and polyvinyl acetate; and chlorinated parafins.

While it it is not thoroughly understood how suppression is manifested by the use of such materials, it is believed that the mechanism of suppression may be explained as follows. If the flaring suppressor molecules become vaporized and are present in gap 27, they will attract and hold electrons forming a negative ion. The resulting field at the nuclei emission sites will suppress or terminate the emission. Flaring suppressor molecules remaining in dielectric layer 32 will attract electrons and bind them firmly into place so that they will not be available to participate in lateral breakdown and form a flare 16.

Experiments have demonstrated that the level of concentration of a suppressor agent in a dielectric layer by weight is about 0.005% to 0.5% of the polymer solids comprising the dielectric coating formula.

The invention is further illustrated in greater detail by reference to the following example. However, as understood by those skilled in the art, this example should not be construed as limiting the scope and substance of this invention. Unless otherwise indicated, all parts, percents, ratios and the like are by weight.

EXAMPLE 1

A dielectric paper was prepared with some polyvinyl fluoride, $PVF_2$, added to the pigment of the dielectric layer or coating material. The dielectric coating material used is one that is in standard use and known in the industry as a dielectric coating on conductive paper base for use with electrographic or electrostatic plotters. The dielectric material comprises a modified acrylic polymer manufactured by Desoto and known as Desoto 342 combined with a pigment comprising calcium carbonate and $TiO_2$. Emphos TM is added as a pigment dispersent, i.e. to provide electrographic head clearance or spacing, e.g., about 10 μm, between the head and the dielectric paper surface, which spacing technique is known in the art. A solvent was added to form a homogenous mixture comprising tobuene and alcohol, which may be either ethanol, methanol or poly propyl alcohol. $PVF_2$ was added to the pigment mixture in the amount of about 0.25% of the dielectric polymer solids comprising the above mixture. After mixing, the pigment was coated on a conductive paper base to produce an electrographic recording medium. Under testing conditions, as illustrated in FIG. 2, the prepared recording medium showed a marked reduction in flaring due to the presence of $PVF_2$, which helped the nuclei 14 to hold their charge and suppressed or quenched lateral electrical discharge or emission breakdown.

EXAMPLE 2

The same dielectric coating material was used as in Example 1 except that zinc stearate was added to the pigment mixture in the amount of about 0.5% of the dielectric polymer solids of the dielectric pigment mixture. After mixing, the pigment was coated on a conductive paper base to produce an electrographic recording medium. Under testing conditions as illustrated in FIG. 2, the prepared recording medium showed a marked reduction in flaring due to the presence of zinc stearate. Also, it is believed that the zinc stearate additive also contributed to the adhesion of the dielectric coating to the paper base.

While the invention has been described in conjunction with a few specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A method of preventing flaring in electrographic recording comprising
   - providing a recording medium having a medium base,
   - coating one side of said medium base with a dielectric composition to form a dielectric charge retentive layer thereon,
   - the improvement comprising:
   - incorporating a flaring suppressor agent in said composition or coating a flaring suppressor agent on the surface of said dielectric charge retentive layer to suppress lateral electrical discharge breakdown due to electron and field assisted thermonic emission processes occurring at or adjacent to the center of the breakdown.

2. The method of claim 1 wherein said flaring suppressor agent comprises fluoro carbons or fluoro sulfurs.

3. The method of claim 2 wherein said flaring suppressor agent consists of polyvinyl fluoride or sulfur hexafloride.

4. An electrographic recording medium comprising a medium base, a dielectric recording layer formed on one of the surfaces of said base and a flaring suppressor agent incorporated into or coated onto said dielectric layer to suppress lateral electrical discharge breakdown due to electron and field assisted thermonic emission processes occurring at or adjacent to the center of the breakdown.

5. The electrographic recording medium of claim 4 wherein said flaring suppressor agent comprises fluoro carbons or fluoro sulfurs.

6. The electrographic recording medium of claim 4 wherein said flaring suppressor agent consists of polyvinyl fluoride, sulfur hexafloride or zinc stearate.

7. The electrographic recording medium of claim 4 wherein said flaring suppressor agent is selected form the group consisting of fluoro carbons, such as polyvinyl fluoride ($PVF_2$); fluoro sulfurs, such as sulfur hexafloride ($SF_6$); organo metallic salts or soaps, such as zirconium actoate, calcium stearate, zinc stearate and iron neonap; unsaturated polyester polymers; styrenated acrylic polymers; florinated or chlorinated polymers and chlorinated parafins.

* * * * *